United States Patent
Hefty et al.

(10) Patent No.: US 9,749,413 B2
(45) Date of Patent: Aug. 29, 2017

(54) PEER-TO-PEER INTERRUPT SIGNALING BETWEEN DEVICES COUPLED VIA INTERCONNECTS

(75) Inventors: Mark S. Hefty, Aloha, OR (US); Robert J. Woodruff, Banks, OR (US); Jerrie L. Coffman, Hillsboro, OR (US); William R. Magro, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 524 days.

(21) Appl. No.: 13/997,250

(22) PCT Filed: May 29, 2012

(86) PCT No.: PCT/US2012/039871
§ 371 (c)(1),
(2), (4) Date: May 23, 2014

(87) PCT Pub. No.: WO2013/180691
PCT Pub. Date: Dec. 5, 2013

(65) Prior Publication Data
US 2014/0250202 A1    Sep. 4, 2014

(51) Int. Cl.
*H04L 29/08* (2006.01)
*G06F 13/24* (2006.01)
(Continued)

(52) U.S. Cl.
CPC .......... *H04L 67/1097* (2013.01); *G06F 9/467* (2013.01); *G06F 13/24* (2013.01); *G06F 13/38* (2013.01)

(58) Field of Classification Search
CPC .......... G06F 13/24; G06F 9/467; G06F 13/38; H04L 67/1097
See application file for complete search history.

(56) References Cited

U.S. PATENT DOCUMENTS 5,481,724 A * 1/1996 Heimsoth .............. G06F 13/24
709/229
6,594,712 B1  7/2003 Pettey et al.
(Continued)

FOREIGN PATENT DOCUMENTS

CN    104094244 A    10/2014
EP      2761482 B1    11/2016
(Continued)

OTHER PUBLICATIONS

International Search Report and Written Opinion received for PCT Application No. PCT/US2012/039871, mailed on Feb. 28, 2013, 10 pages.
(Continued)

*Primary Examiner* — Oanh Duong
(74) *Attorney, Agent, or Firm* — Alpine Technology Law Group LLC (57) ABSTRACT

Methods and apparatus to provide peer-to-peer interrupt signaling between devices coupled via one or more interconnects are described. In one embodiment, a NIC (Network Interface Card such as a Remote Direct Memory Access (RDMA) capable NIC) transfers data directly into or out of the memory of a peer device that is coupled to the NIC via one or more interconnects, bypassing a host computing/processing unit and/or main system memory. Other embodiments are also disclosed.

22 Claims, 5 Drawing Sheets

(51) Int. Cl.
*G06F 13/38* (2006.01)
*G06F 9/46* (2006.01)

(56) References Cited

U.S. PATENT DOCUMENTS

| | | | |
|---|---|---|---|
| 7,302,512 B1 * | 11/2007 | Currid | G06F 9/46 710/260 |
| 7,702,826 B2 | 4/2010 | Oztaskin et al. | |
| 8,103,816 B2 * | 1/2012 | Tiruvallur | G06F 13/24 710/261 |
| 8,914,556 B2 | 12/2014 | Magro et al. | |
| 2005/0220128 A1 | 10/2005 | Tucker et al. | |
| 2005/0228922 A1 * | 10/2005 | Tsao | G06F 9/4812 710/268 |
| 2006/0165084 A1 | 7/2006 | Makhervaks et al. | |
| 2006/0253619 A1 * | 11/2006 | Torudbakken | G06F 13/4022 710/31 |
| 2007/0162641 A1 | 7/2007 | Oztaskin et al. | |
| 2008/0019365 A1 | 1/2008 | Tripathi et al. | |
| 2008/0104337 A1 | 5/2008 | VelurEunni | |
| 2008/0294825 A1 * | 11/2008 | Mahalingam | G06F 9/4812 710/262 |
| 2008/0313364 A1 | 12/2008 | Flynn et al. | |
| 2010/0083247 A1 * | 4/2010 | Kanevsky | G06F 13/28 718/1 |
| 2010/0332720 A1 | 12/2010 | Chang et al. | |
| 2011/0161551 A1 | 6/2011 | Khosravi et al. | |
| 2011/0246686 A1 * | 10/2011 | Cavanagh, Jr. | G06F 13/28 710/22 |
| 2011/0302349 A1 * | 12/2011 | Griggs | G06F 13/26 710/311 |
| 2012/0254480 A1 * | 10/2012 | Tamir | G06F 13/385 710/22 |
| 2013/0275631 A1 | 10/2013 | Magro et al. | |

FOREIGN PATENT DOCUMENTS

| | | |
|---|---|---|
| JP | 5869135 B2 | 1/2016 |
| KR | 10-2014-0071392 A | 6/2014 |
| WO | 2013/048477 A1 | 4/2013 |
| WO | 2013/180691 A1 | 12/2013 |

OTHER PUBLICATIONS

International Search Report and Written Opinion received fro PCT Application No. PCT/US2011/054394, mailed on May 11, 2012, 9 pages.

International Preliminary Report on Patentability and Written Opinion received for PCT Patent Application No. PCT/US2011/054394, mailed on Apr. 10, 2014, 8 pages.

Communication from corresponding European Patent Application No. 11873525.7, mailed on May 21, 2014, 3 pages.

Notice of Allowance received for U.S. Appl. No. 13/997,601, mailed on Aug. 8, 2014, 9 pages.

Extended European Search Report received for European patent Application No. 11873525.7, mailed on Mar. 25, 2015, 6 pages.

* cited by examiner

PEER-TO-PEER INTERRUPT SIGNALING BETWEEN DEVICES COUPLED VIA INTERCONNECTS

FIELD

The present disclosure generally relates to the field of electronics. More particularly, an embodiment relates to peer-to-peer interrupt signaling between devices coupled via one or more interconnects.

BACKGROUND

Message signaled interrupts (MSI) are a feature that enables a device function to request service by writing a system-specified data value to a system-specified address using, for example, a PCI (Peripheral Components Interconnect) DWORD (double word) memory write transaction. MSI is optional for PCI specifications through PCI Local Bus Specification Rev. 3.0, Feb. 3, 2004, may be used in PCI Express (PCIe) Specifications (PCIe Specification, Revision 1.0a, June 2005), and is included in PCI-X specifications (PCI-X Specification Rev. 2.0a, Apr. 23, 2003). Moreover, MSI is an interrupt-generation mechanism that enables a PCI device to send an inbound memory write on its PCI bus to a front side bus that may be coupled to a processor, bypassing an IOxAPIC (input output advance programmable interrupt controller).

MSI-X is an enhancement to MSI. MSI and MSI-X are described in PCI Local Bus Specification, Rev. 3.0, section 6.8, pp. 231-253. MSI and MSI-X may however be inefficient as the interrupts are generally communicated via a host system, in turn, causing potentially significant delays.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may provide efficient mechanisms for a NIC (Network Interface Card such as a Remote Direct Memory Access (RDMA) capable NIC) to transfer data directly into or out of the memory of a peer device that is coupled to the NIC via one or more interconnects (such as a PCI, PCIe, PCI-X, etc.). For example, such mechanisms may be useful for clustered computing and HPC (High Performance Computing) applications which may be running on a processor plug-in card, such as MIC (Many Integrated Core) adapters, which may generally include one or more processor cores integrated on a single card that is pluggable into a system (e.g., via a PCI connection or another type of interconnect, a bus, etc.).

RDMA generally refers to a feature of NIC that enables a computing device to access information in a memory of another computing device that is coupled to the NIC via one or more interconnects such as PCI. For example, via RDMA technology, a computing device may read information from the memory of another computing device, as well as write information to the memory of another computing device, without involvement of a host operating system (OS). Furthermore, as discussed herein, the term "MSI" is intended to refer to "MSI" and/or "MSI-X." Additionally, the usage of PCI, PCIe, PCI-X, or other types of PCI may be interchangeable herein.

In one embodiment, through the use of a peer-to-peer mechanism, a network adapter may directly (e.g., bypassing a host computing/processing unit and/or main system memory) notify a process running on a peer (e.g., PCI) device that a data transfer operation involving the peer device's memory has completed. In an embodiment, MSI-X entries may be allocated and/or distributed between a host processing unit and a peer (e.g., PCI) device. Such embodiments are envisioned to allow for a wider range of applications, such as providing access to a network on a processor plug-in card.

In contrast, some current network adapters may issue interrupts directly to a host system. An interrupt generally refers to an asynchronous signal indicating occurrence of an event that may cause an operation to be performed (e.g., to service the triggered interrupt). The software on the host system may then inform the PCI processor adapter that a specific operation has completed, in effect, proxying the interrupt to the peer PCI device. This may result in significant latency in reporting the completion of an operation.

Figure 1:
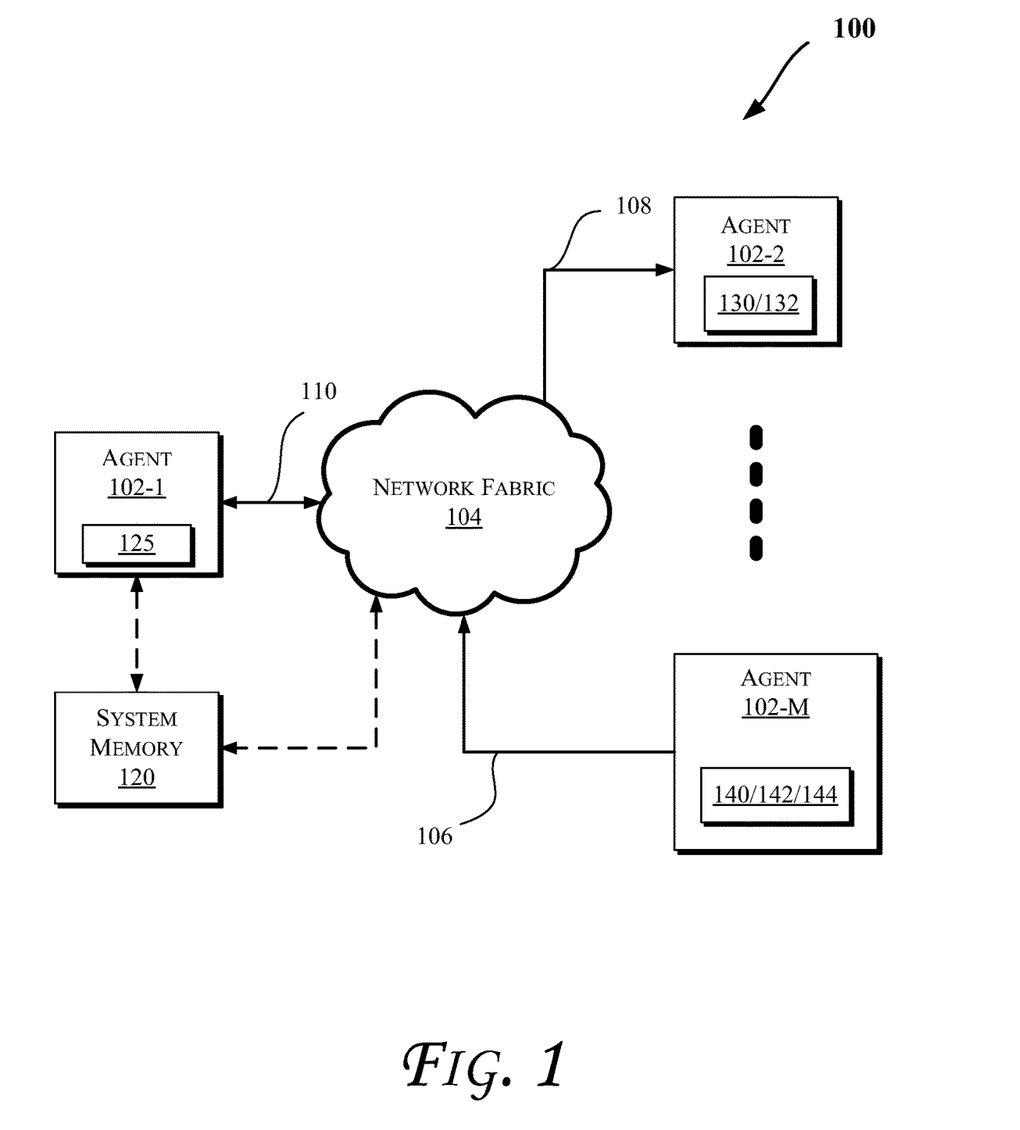
FIGS. 1, 2, 4, and 5 illustrate block diagrams of embodiments of computing systems, which may be utilized to implement various embodiments discussed herein.

The network adapter that directly notifies a process running on a peer (e.g., PCI) device about completion of a data transfer operation may be provided in any type of a computing system, such as the systems discussed herein, e.g., with reference to FIGS. 1-5. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIG. 2, 4, or 5. As illustrated in FIG. 1, the agents 102 may communicate via a network fabric 104. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers). In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110). In an embodiment, at least one of the agents (e.g., 102-1) may be a host processing unit (e.g., such as one of the processors discussed herein with reference to the remaining figures) which may include one or more interrupt registers 125. In an embodiment, agent 102-1 may be a host processing unit with access to a host system memory 120. Alternatively, the system memory 120 may be accessible (e.g., directly coupled to the network fabric 104) by other agents in the system. Another agent (e.g., 102-2) may be an RDMA NIC (e.g., with a data transfer engine 130 and one or more MSI-X registers 132 as will be further discussed herein. Yet another agent (e.g., agent 102-M) may be an offload processing unit (including, for example, a processor plug-in card, such as a MIC adapter) which includes one or more MSI registers 140 (which may be used for message signal interrupt operations other than the ones discussed with reference to direct transfers between the offload processing unit and the RDMA NIC, such as discussed with reference to FIGS. 2 and 3), one or more interrupt registers 142, and a memory/storage device 144.

Figure 2:
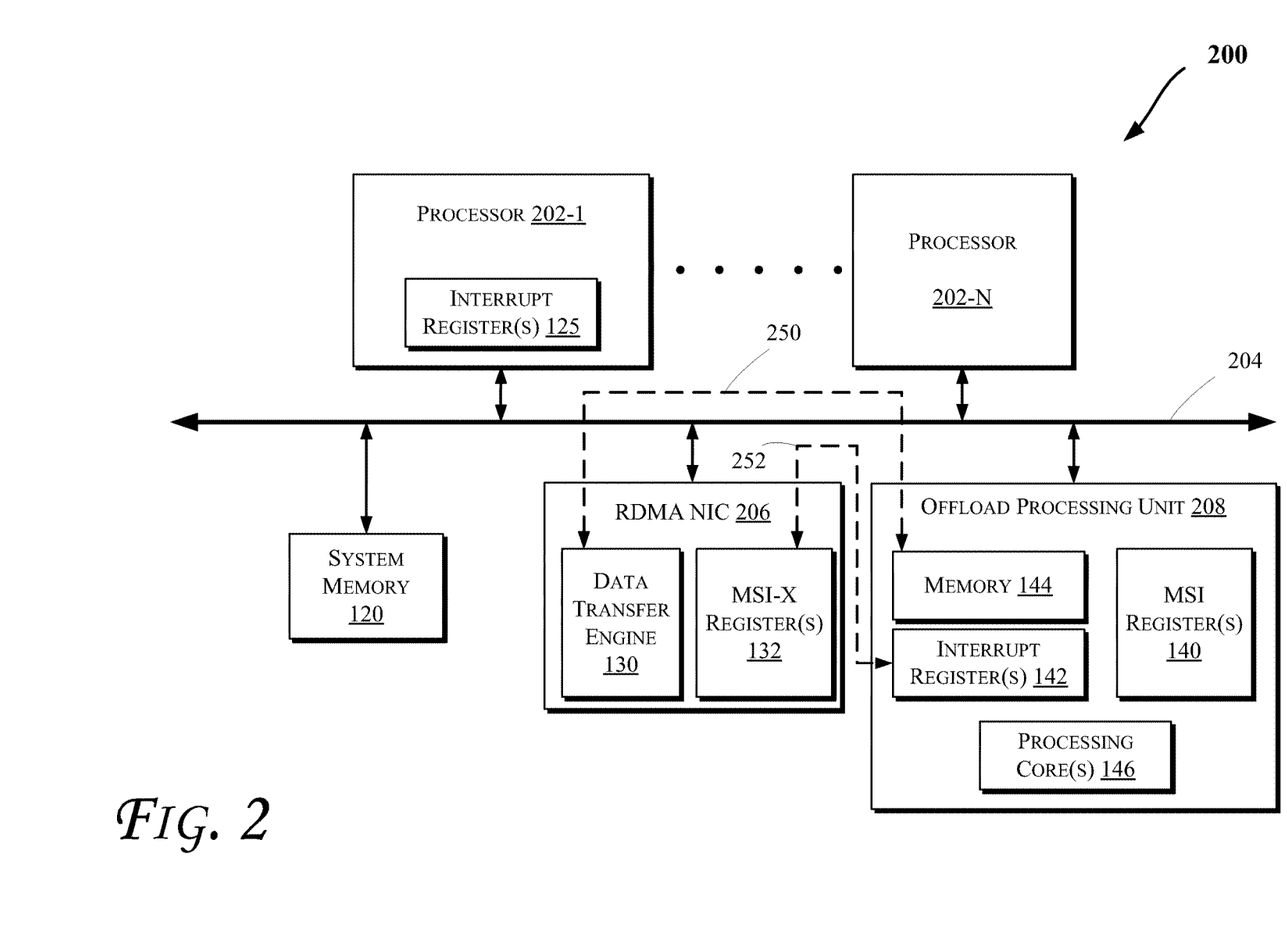

FIG. 2 illustrates a block diagram of portions of a computing system 200, according to an embodiment. In one embodiment, various components of the system 200 may be implemented by one of the agents 102-1 and/or 102-M discussed with reference to FIG. 1. Further details regarding some of the operation of the computing system 200 will be discussed herein with reference to FIGS. 3-5.

The system 200 may include one or more processors 202-1 through 202-N (collectively referred to herein as "processors 202" or more generally "processor 202"). At least one of the processors 202-1 through 202-N may provide a host processing unit in the system 200. Each of the processors 202 may include various components, but for clarity, sample components are only shown with reference to processor 202-1. Also, as will be further discussed herein with reference to FIGS. 4-5, each processor 202 may include one or more processor cores.

As shown, the processor 202-1 may include one or more interrupt registers. The register(s) 125 may be hardware registers used to store interrupt codes that indicate occurrence of an event, which may in turn be used to trigger a function or operation (e.g., to service the triggered interrupt). Also, the processors 202 may communicate through a bus 204 (also referred to herein as an interconnect interchangeably, including, for example a PCI, PCIe, PCI-X, etc.) with other components such as one or more other processors, a NIC 206, system memory 120, and/or an offload processing unit 208.

The NIC 206 may include the RDMA feature via a data transfer engine/logic 130 (e.g., to transfer data to/from the memory 144 as illustrated by the dotted line 250 in FIG. 2). The NIC 206 may also include one or more MSI-X registers to store interrupt codes in accordance with the MSI-X specification. The offload processing unit 208 may include one or more MSI registers (e.g., to store interrupt codes in accordance with the MSI specification), one or more interrupt registers 142 (which may be similar to interrupt register(s) 125 in some embodiments), a memory 144 (e.g., to store data and/or instructions), and one or more processing cores 146 (e.g., to execute instructions such as discussed with other processors with reference to FIGS. 1-5, including receiving and/or processing one or more MSIs). In an embodiment, the offload processing unit 208 may be a processor plug-in card, such as a MIC adapter, etc.

In an embodiment, the RDMA NIC 206 notifies the offload processing unit 208 of a completed data transfer using peer-to-peer MSI-X notifications (e.g., through writing to the interrupt register(s) 142 in response to changes to the MSI-X register(s) 132, as illustrated by the dotted line 252 in FIG. 2).

Figure 3:
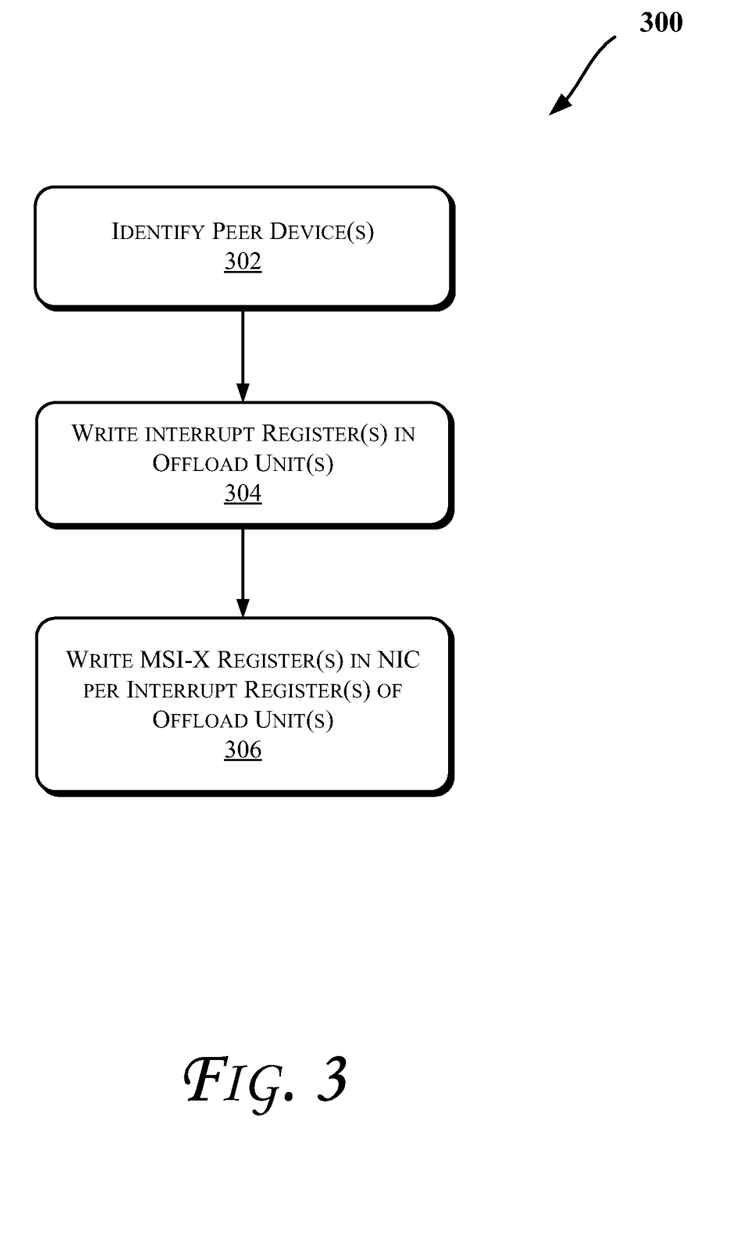
FIG. 3 illustrates a flow diagram of a method according to an embodiment.

FIG. 3 illustrates a flow diagram of a method 300 to provide peer-to-peer interrupt signaling between devices coupled via one or more interconnects, according to an embodiment. In an embodiment, various components discussed with reference to FIGS. 1-2 and 4-5 may be utilized to perform one or more of the operations discussed with reference to FIG. 3.

As discussed with reference to FIG. 2, in some embodiments, peer-to-peer MSI-X completion notification may involve a host system with MSI-X support (e.g., registers 132), a NIC with RDMA support (e.g., NIC 206), and a peer adapter (e.g., unit 208) capable of responding to MSI-X interrupts. Typically, the host system software may configure the MSI-X registers 132 on the NIC to reference the interrupt registers 125 on the host processing unit. As previously discussed, this approach may cause potentially significant delays. By contrast, some embodiments modify the configuration of the MSI-X as follows:

1. Peer devices, which the NIC 206 may directly transfer data to and from, are identified at an operation 302. One such device is shown in FIG. 2 as the offload processing unit 208.

2. Offload processing unit(s) 208 have their interrupt registers 142 programmed/written with MSI-X addresses that a peer device (e.g., NIC 206) may use to signal the offload processing unit(s) 208 (e.g., from MSI-X register(s) 132) at an operation 304.

3. The addresses that were stored in the offload processing unit's interrupt registers 142 are written into the MSI-X registers 132 on the NIC 206 at an operation 306.

In an embodiment, the MSI-X registers 132 on the NIC 206 may be programmed/written/allocated to reference interrupt registers 125 on the host processing unit 202-1 and/or one or more interrupt registers 142 of offload processing unit(s) 208. The actual allocation of MSI-X registers 132 may be dependent on one or more of: the hardware capabilities of the devices in question, requirements of the application software on the peer or host, and/or type of connection between the peer devices and/or host unit(s), etc. For example, different sets of data may go to different targeted processors/processing units and interrupts would follow the data transfers. Hence, in an embodiment, RDMA NIC 206 sends the data stream directed to different processors/processing units, changing the interrupt format based on what data stream the interrupt is following. Similarly, the interrupt registers on the offload processing unit may be allocated between the host (e.g., processor 202-1) and one or more peer devices.

Furthermore, the data transfer engine 130 on the NIC 206 may be programmed with the IO (Input Output) memory address on the offload processing unit 208. This allows the NIC 206 to transfer data directly into or out of the memory 144 on the offload unit 208 (as illustrated by the dotted line 250 in FIG. 2), bypassing the host processing unit 202-1 and system memory 120. Note that the data transfer is as viewed from an application running on the offload processing unit 208. The actual movement of data may involve the NIC 206 to send or receive multiple network packets, resulting in multiple transactions.

Once the higher level data transfer has completed, if an interrupt has been requested, the NIC 206 may write an interrupt message to the bus 204 using the address specified in the MSI-X register 132 associated with the transfer. This signals an interrupt register 142 on the offload unit 208, which may in turn initiate an interrupt handler on the unit 208, completing the data transfer.

Figure 4:
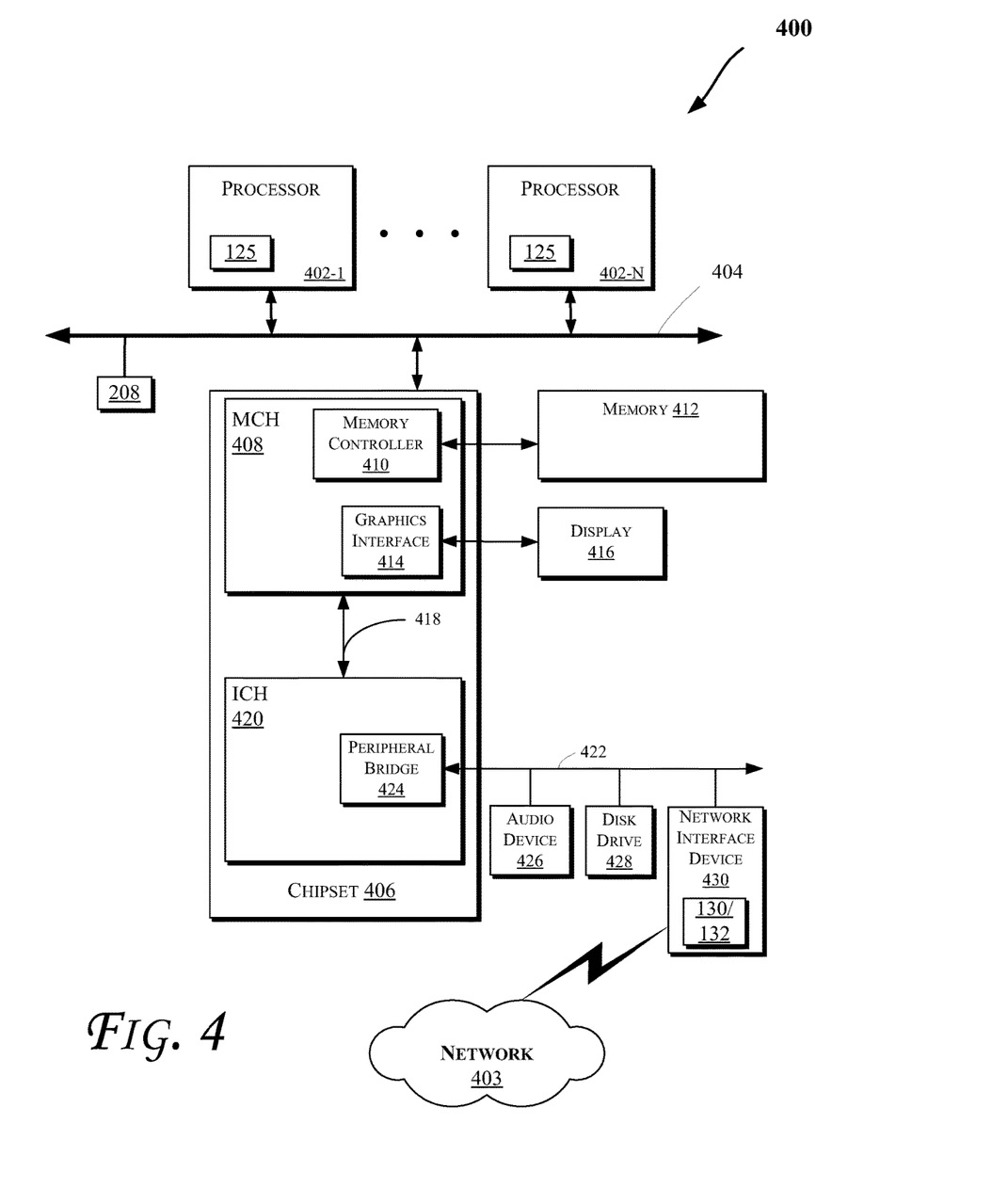

FIG. 4 illustrates a block diagram of a computing system 400 in accordance with an embodiment of the invention. The computing system 400 may include one or more central processing unit(s) (CPUs) 402-1 through 402-M or processors (collectively referred to herein as "processors 402" or more generally "processor 402") that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. Also, the operations discussed with reference to FIGS. 1-3 may be performed by one or more components of the system 400. In some embodiments, the processors 402 may be the same or similar to the processors 202 of FIG. 2. Also, as shown in FIG. 4, system 400 may include devices 125, 130, 132, 208, etc. such as discussed with reference to FIGS. 1-3.

A chipset 406 may also communicate with the interconnection network 404. The chipset 406 may include a memory controller hub (MCH) 408. The MCH 408 may include a memory controller 410 that communicates with a memory 412. The memory 412 may store data, including sequences of instructions that are executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

Additionally, one or more of the processors 402 may have access to one or more caches (which may include private and/or shared caches in various embodiments) and associated cache controllers (not shown). The cache(s) may adhere to one or more cache coherent protocols. The cache(s) may store data (e.g., including instructions) that are utilized by one or more components of the system 400. For example, a cache may locally cache data stored in a memory 412 for faster access by the components of the processors 402. In an embodiment, the cache (that may be shared) may include a mid-level cache and/or a last level cache (LLC). Also, each processor 402 may include a level 1 (L1) cache. Various components of the processors 402 may communicate with the cache directly, through a bus or interconnection network, and/or a memory controller or hub.

The MCH 408 may also include a graphics interface 414 that communicates with a display device 416, e.g., via a graphics accelerator 416. In one embodiment of the invention, the graphics interface 414 may communicate with the graphics accelerator via an accelerated graphics port (AGP). In an embodiment of the invention, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416. A hub interface 418 may allow the MCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the MCH 408 in some embodiments of the invention. In addition, the processor 402 and various components of the system 400 may be present on a single integrated circuit die/chip (including for example one or more of the memory controller 410, graphics interface 414, MCH 408, ICH 420, chipset 406, etc.).

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
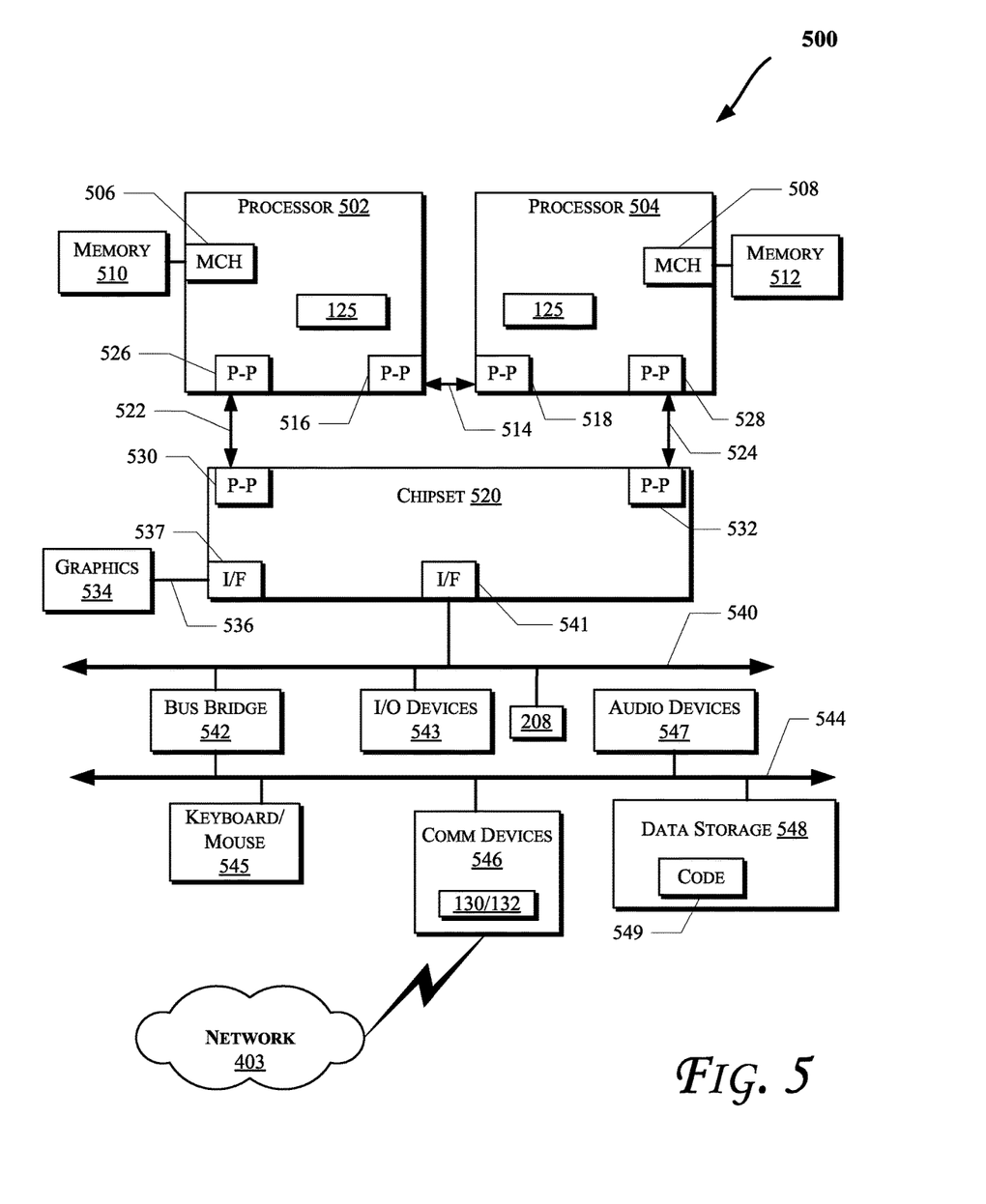

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500. As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4. As shown in FIG. 5, the processors 502 and 504 may also include one or more caches as discussed with reference to FIG. 4. Also, as shown in FIG. 5, system 500 may include devices 125, 130, 132, 208, etc. such as discussed with reference to FIGS. 1-4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

At least one embodiment of the invention may be provided within the processors 502 and 504 or chipset 520. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with a bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a first agent, at least a portion of which is in hardware, coupled to a second agent via an interconnect;
the first agent to comprise logic to transfer data to and from a memory of the second agent via Remote Direct Memory Access (RDMA), bypassing a host processing unit and a main system memory,
wherein the first agent is to notify a process running on the second agent that a data transfer operation involving the memory of the second agent has completed via modification to one or more interrupt registers of the second agent, wherein the first agent is to comprise one or more Message Signaled Interrupt X (MSI-X) registers to store one or more MSI-X addresses, wherein an allocation logic is to allocate the one or more MSI-X registers based on one or more of: hardware capabilities of the first agent, second agent, and/or host processing unit; requirements of an application software running on the first agent, the second agent, or the host processing unit; and a type of connection between at least two of: the first agent, the second agent, and the host processing unit.

2. The apparatus of claim 1, wherein the one or more MSI-X registers of the first agent are to reference one or more interrupt registers in the host processing unit and/or the one or more interrupt registers of the second agent.

3. The apparatus of claim 1, wherein the first agent is to transmit one or more data streams directed to different processors or processing units and wherein a format of one or more subsequent interrupts are to be modified based on the one or more transmitted data streams.

4. The apparatus of claim 1, wherein the first agent is to comprise a Network Interface Card (NIC) to signal completion of the data transfer operation via modification to the one or more interrupt registers of the second agent and based on addresses written to the one or more interrupt registers of the second agent.

5. The apparatus of claim 1, wherein the interconnect is to comprise a peripheral component interconnect (PCI).

6. The apparatus of claim 1, wherein the second agent is to comprise a processor plug-in card.

7. The apparatus of claim 6, wherein the processor plug-in card is provided access to a network based on the first agent notifying the process running on the second agent regarding the completion of the data transfer operation.

8. The apparatus of claim 6, wherein the processor plug-in card is to comprise a Many Integrated Core (MIC) adapter.

9. The apparatus of claim 1, wherein the interconnect is to comprise one or more point-to-point interconnects.

10. A method comprising:
identifying one or more devices coupled via an interconnect, wherein a Network Interface Card (NIC) is capable of directly transferring data to and from the identified one or more devices; and
writing Message Signaled Interrupt X (MSI-X) addresses to one or more interrupt registers of an offload processing unit,
wherein the NIC is to signal completion of a data transfer operation involving a memory of the offload processing unit via modification to the one or more interrupt registers of the offload processing unit and based on the addresses written to the one or more interrupt registers of the offload processing unit, wherein the one or more MSI-X registers are allocated based on one or more of: hardware capabilities of a first device from the one or more devices, a second device from the one or more devices, and/or a host processing unit; requirements of an application software running on the first device, the second device, or the host processing unit; and a type of connection between at least two of: the first device, the second device, and the host processing unit.

11. The method of claim 10, further comprising the NIC transmitting one or more data streams directed to different processors or processing units and modifying a format of one or more subsequent interrupts based on the one or more transmitted data streams.

12. The method of claim 10, further comprising notifying a process running on the offload processing unit in response to completion of the data transfer operation.

13. The method of claim 10, further comprising performing the data transfer operation via Remote Direct Memory Access (RDMA), bypassing the host processing unit and a main system memory.

14. The method of claim 10, further comprising writing the MSI-X addresses into one or more MSI-X registers of the NIC.

15. The method of claim 10, further comprising the NIC signaling the offload processing unit via the MSI-X addresses.

16. A system comprising:
a first agent coupled to a second agent via an interconnect;
the first agent to comprise logic to transfer data to and from a memory of the second agent via Remote Direct Memory Access (RDMA), bypassing a host processing unit and a main system memory; and
logic, at least a portion of which is in hardware, to allocate one or more MSI-X registers of the first agent to reference one or more interrupt registers in the host processing unit and/or the one or more interrupt registers of the second agent,
wherein the first agent is to notify the second agent that a data transfer operation involving the memory of the second agent has completed via the allocated one or more MSI-X registers of the first agent, wherein the first agent is to comprise one or more Message Signaled Interrupt X (MSI-X) registers to store one or more MSI-X addresses, wherein an allocation logic is to allocate the one or more MSI-X registers based on one or more of: hardware capabilities of the first agent, second agent, and/or host processing unit; requirements of an application software running on the first agent, the second agent, or the host processing unit; and a type of connection between at least two of: the first agent, the second agent, and the host processing unit.

17. The system of claim 16, wherein the first agent is to transmit one or more data streams directed to different processors or processing units and wherein a format of one or more subsequent interrupts are to be modified based on the one or more transmitted data streams.

18. The system of claim 16, further comprising an audio device.

19. The system of claim 16, wherein the first agent is to comprise a Network Interface Card (NIC) to signal completion of the data transfer operation via modification to the one or more interrupt registers of the second agent and based on addresses written to the one or more interrupt registers of the second agent.

20. The system of claim 16, wherein the interconnect is to comprise a peripheral component interconnect (PCI).

21. The system of claim 16, wherein the second agent is to comprise a processor plug-in card.

22. The system of claim 16, wherein the interconnect is to comprise one or more point-to-point interconnects.

* * * * *